United States Patent [19]

Adams, Jr. et al.

[11] Patent Number: 4,888,161

[45] Date of Patent: Dec. 19, 1989

[54] METHOD OF FORMING DENSE, UNSINTERED, GRANULAR ALKALINE EARTH METAL CARBONATES

[75] Inventors: Charles Adams, Jr.; Jerry A. Cook, both of Cartersville, Ga.

[73] Assignee: Chemical Products Corporation, Cartersville, Ga.

[21] Appl. No.: 223,386

[22] Filed: Jul. 25, 1988

Related U.S. Application Data

[63] Continuation-in-part of Ser. No. 7,588, Jan. 28, 1987, abandoned.

[51] Int. Cl.⁴ ............................................. C01F 11/18
[52] U.S. Cl. ................... 423/430; 23/293 R; 106/463; 106/465; 241/16; 423/636; 423/637; 501/11; 501/27
[58] Field of Search ............... 423/430, 635, 636, 637; 23/293 R; 106/306, 463, 465; 501/27, 11; 241/16; 252/182.32, 182.33

[56] References Cited

U.S. PATENT DOCUMENTS

| | | | |
|---|---|---|---|
| 3,615,811 | 10/1971 | Barrett et al. | 106/306 |
| 3,661,610 | 5/1972 | Ferris | 106/306 |
| 3,738,938 | 6/1973 | Barrett | 106/463 |
| 3,802,901 | 4/1974 | Robertson et al. | 106/463 |
| 3,883,364 | 5/1975 | Robertson et al. | 106/463 |
| 3,989,195 | 11/1976 | Falcon-Steward | 241/16 |
| 4,208,388 | 6/1980 | Nicholson | 423/636 |
| 4,251,351 | 2/1981 | Bowman | 423/430 |
| 4,257,817 | 3/1981 | Mathur et al. | 423/430 |
| 4,421,729 | 12/1983 | Chiang et al. | 423/162 |
| 4,793,985 | 12/1988 | Price et al. | 423/430 |
| 4,806,331 | 2/1989 | Adams, Jr. et al. | 423/430 |

*Primary Examiner*—Anthony McFarlane
*Attorney, Agent, or Firm*—Sutherland, Asbill & Brennan

[57] ABSTRACT

A method of converting fine particle size alkaline earth metal carbonate, e.g., barium or strontium carbonate, into a free-flowing granular form with relatively high bulk density, without sintering, grinding, or briquetting, is disclosed. It involves the following steps:

(a) forming a suspension of the carbonate in water with enough deflocculating agent, e.g., sodium polyacrylate or sodium hexametaphosphate, to substantially completely deflocculate the carbonate;

(b) drying the resultant suspension at a temperature that is elevated, but without heating the carbonate to its sintering point, for example by spray drying in a spray drier operating at an inlet temperature in the range of about 400° to 600° C., to obtain a granular material primarily passing 10 mesh and held on a 150 mesh screen (Tyler); and (c) heating the granular material to about 600° to 700° C., which causes it to shrink, thereby increasing its bulk density by at least about 5%, preferably at least 10 or 20 percent.

The product is especially useful as an additive for glass used to make television face plates.

26 Claims, No Drawings

METHOD OF FORMING DENSE, UNSINTERED, GRANULAR ALKALINE EARTH METAL CARBONATES

This application is a continuation-in-part of Ser. No. 7,588, filed Jan. 28, 1987, now abandoned.

This invention concerns a method of preparing granular form alkaline earth metal carbonate, e.g., strontium or barium carbonate, that has high bulk density without being sintered.

Strontium carbonate is a white, crystalline solid having a rhombic structure below 926° C. It is essentially insoluble in water. Barium carbonate also is an insoluble, white, crystalline solid.

In the current commercial production of strontium carbonate or barium carbonate, naturally occurring strontium sulfate (celestite ore) or barium sulfate (barite ore) is reduced to strontium sulfide or barium sulfide, both of which are water-soluble. The sulfide is dissolved in water, then the solution is filtered to remove insoluble impurities. Substantially pure carbonate crystals of about 1 micron particle size are precipitated from solution by the introduction of either sodium carbonate or carbon dioxide gas. These crystals, when washed, filtered, and dried, yield very fluffy, low bulk density powders, e.g., on the order of about 35 to 45 pounds per cubic foot (loose).

The largest use of strontium carbonate is in the manufacture of glass face plates for color television sets. This is the pane of glass separating the viewer from the cathode ray tube. Strontium carbonate is present in the glass at a concentration of about 12 to 14 weight percent (calculated as strontium oxide) and functions as an x-ray absorber. Strontium is an effective x-ray barrier because it has a large atomic radius. Strontium (added as strontium carbonate) is a required ingredient in the face plates of the relatively high voltage television sets used in the U.S. and Japan. A lesser amount of barium carbonate also is incorporated in these face plates. The face plates of black-and-white television sets and the lower voltage Western European color television sets contain barium carbonate as the primary x-ray absorber.

The quality of the glass face plates for television sets is critical. If the slightest imperfection in the face plate, such as a tiny undissolved "stone" or a "cold glass defect", caused by incomplete mixing of the glass batch ingredients, is detected, the face plate must be broken and remelted in the glass furnace. This recycling of flawed face plates is expensive in terms of energy use and reduction of plant capacity.

The fluffy, dusty, low bulk density powders normally obtained by drying precipitated strontium carbonate and barium carbonate are not suitable as feedstocks for glass furnaces. The powders are not free-flowing and cannot be discharged from bulk storage bins. Their low bulk density greatly reduces the amount of strontium carbonate or barium carbonate that can be stored in a given volume. The dustiness makes it impossible to accurately control the chemical composition of a glass batch because a substantial amount of strontium or barium will escape from the glass furnace. Dusty barium carbonate poses a handling hazard as well, since it is poisonous.

While some briquetting of the strontium carbonate or barium carbonate powder under high pressure has been employed, strontium carbonate and barium carbonate products suited for feedstock for glass manufacture have heretofore been produced almost exclusively by heating the dried filter cake to temperatures of about 800° C., in refractory-lined kilns, to sinter the individual crystals, allowing them to adhere to one another to form larger particles. This yields dense, hard granules which must be ground to the desired final product particle size, which generally is 100% passing through a 14 mesh screen (Tyler). (Throughout this specification, when screen sizes are mentioned, it will be with reference to the Tyler standard screen scale sieves.) To reduce the dustiness of these ground products, they usually are screened to remove fines which pass through a 150 mesh screen; however, some fines generated during grinding invariably remain with the product.

Some contamination of the product occurs as a result of this high-temperature sintering. If the sintering is carried out in a refractory brick-lined kiln, which is the usual practice, a small amount of the refractory material will inevitably contaminate the strontium carbonate or barium carbonate product. If the sintering is carried out in an unlined, metallic piece of equipment, metallic contamination of the product normally will result. Both forms of contamination are troublesome. Refractory contaminants are difficult to melt or dissolve in a glass furnace charge, causing defects in the glass. Metallic contamination causes undersirable coloration of the glass. Also, the high temperatures required for sintering are hard on metallic equipment, requiring it to be repaired or replaced frequently.

We have invented a process of converting fine particle size alkaline earth metal carbonate into a free-flowing granular form with relatively high bulk density, and exhibiting good solubility in a glass furnace charge, without sintering, grinding, or briquetting. By "sintering" we mean the coalescence by heat of the particles into larger particles. To cause sintering, the precipitated material must be subjected to a high enough temperature, for a long enough period of time, to cause the material to become semi-molten. The present process involves the following steps:

(a) forming a suspension of the carbonate in water with enough deflocculating agent to substantially completely deflocculate the carbonate;

(b) drying the resultant suspension without allowing the carbonate to reach its sintering temperature; and (c) heating the resultant granular product by placing it in a zone maintained at a temperature in the range of about 600° to 700° C. for a time long enough to increase the loose bulk density of the product by at least about 5 percent.

The resulting product is a free-flowing, relatively dense, granular material without many fines and without the contaminants normally resulting from sintering in brick or metal-lined vessels. Although our process may be performed in metallic equipment, contamination is less than with sintering because the temperatures used are lower.

As compared to sintered forms, our product has a much higher surface area, which seems to shorten its dissolution time in molten glass.

The alkaline earth metal carbonate that can be converted into granular form by the present process must be in a form in which it can be suspended in water and deflocculated. Preferably, sintered materials will not be used, since they are most difficult to suspend and deflocculate. A wet filter cake of freshly precipitated alkaline earth metal carbonate is ideal to use. Freshly precipitated barium carbonate crystals generally have a particle size primarily in the range of about 0.7 to 1.1 microns. For strontium carbonate the size is primarily in the range of about 0.6 to 1.0 micron.

The suspension preferably will contain at least about 35% alkaline earth metal carbonates, based on the volume of the suspension. This refers to the volume of the carbonate as calculated from its specific gravity. Barium carbonate has a specific gravity of 4.43. A thirty-five volume percent suspension of barium carbonate in water contains 70.5 weight percent of the salt. Strontium carbonate has a specific gravity of 3.70. A thirty-five volume percent suspension of that salt contains 66.6 weight percent strontium carbonate.

The deflocculating agent should be a water-soluble, glass-compatible chemical. In other words, it should not contain any chemical groups that would interfere with the operation in the glass furnace or cause defects in the glass. Preferred deflocculants are condensed phosphates and salts that contain an organic macromolecular anion.

Examples of suitable condensed phosphates are the pyrophosphates, hexametaphosphates, tripolyphosphates, and tetraphosphates. The alkali metal phosphates, especially the sodium and potassium phosphates, are most preferred.

If the deflocculant used is a salt that contains an organic macromolecular anion, it is preferred that the anion have a number average molecular weight in the range of about 500 to 5000, most preferably about 1,000 to 3,000. The organic macromolecular anion can be polymeric; examples of suitable water-soluble salts of this type include alkali metal or ammonium salts of a polymer of an ethylenically-unsaturated carboxylic acid, e.g., acrylic acid or methacrylic acid, of sulfonated condensation products of naphthalene and formaldehyde, and of lignosulfonic acid. The sodium and potassium salts are most preferred.

Enough deflocculating agent is used to cause substantially complete deflocculation of the suspended carbonate. When using inorganic condensed phosphate as the deflocculant, it usually will suffice to use about 0.10 to 0.40% thereof, based on the dry weight of the carbonate. When using the macromolecular anionic salts, an amount in the range of about 0.10 to 0.30% (calculated as the dry anionic salt) usually will be adequate.

The mixture is preferably stirred or otherwise agitated to assure thorough blending of the ingredients. We are unaware of any criticality in the mixing temperature, but preferably it is kept in the range of about 30° to 50° C.

Complete deflocculation of the alkaline earth metal carbonate results in the lowest achievable viscosity for the suspension. The following procedure may be used to determine how much of the deflocculant must be added to obtain substantially complete deflocculation of a suspension containing 39 vol. % of the carbonate:

Dry a sample of the flocculated alkaline earth metal carbonate crystals in a laboratory oven at 110° C. For strontium carbonate weigh out 700 g. of the dried crystals and slowly add it to 300 ml. of water in the steel cup of a Hamilton Beach high speed, heavy duty, laboratory mixer. The mixer should be connected to a variable rheostat to allow the mixer's speed to be adjusted during the addition, so as to avoid sloshing. Whenever the suspension in the mixing cup loses fluidity, temporarily stop adding the carbonate powder and introduce the deflocculant in doses of 175 mg. each to restore fluidity, until all of the carbonate has been added. When all of the carbonate has been added, mix at "medium" speed for 5 minutes, then pour the suspension into a 500 ml. laboratory beaker. Measure the low shear viscosity of the slurry using a Brookfield Model RVF viscometer with a number 2 spindle turning at 20 rpm. After reading the viscosity, pour the suspension back into the mixing cup, add an additional dose of 175 mg. of deflocculant, mix at "low" speed for 5 minutes, then pour the suspension back into the beaker and remeasure the viscosity as before. Repeat this procedure until two successive additions of deflocculant either do not reduce the viscosity of the suspension or increase it. It can be assumed that substantially complete deflocculation is achieved at a deflocculant dose equal to 0.025% multiplied by the number of doses added, omitting the last 2 doses. This percentage is based on the dry weight of the strontium carbonate present. For barium carbonate, follow the same procedure, except use 740 g. of the dry carbonate, 260 ml. of water, and deflocculant doses of 185 mg. each.

After the alkaline earth metal carbonate is substantially completely deflocculated, the suspension is dried at an elevated temperature. The drying should be conducted without allowing the alkaline earth metal carbonate to reach sintering temperature. Preferably the material will not be allowed to reach a temperature as high as 600° C. Spray drying is the preferred means, for example using a nozzle-atomized, countercurrent flow spray drier operating at an inlet temperature in the range of about 400° to 600° C. Because of the short residence time in a spray drier, the suspended solids do not reach the inlet temperature of the drier. For example, operating at an inlet temperature of about 400° to 600° C. usually will only raise the temperature of the solids to about 70° to 200° C. Lower inlet temperatures can be used, but they result in less thermal efficiency. Other types of driers, such as fluidized bed driers, might also be used.

The variables of the drying operation, such as nozzle size and spraying pressure, preferably are controlled so as to produce a substantially dry, granular product having a particle size primarily in the range of 10 to 150 mesh (Tyler). Preferably at least about 80 weight percent of the product will pass 10 mesh but be held on a 150 mesh screen. Most preferably at least about 95 weight percent of the particles will be in this size range.

Two different types of bulk density can be measured of particulate material: loose and tapped. As referred to in this specification, loose bulk density is measured after simply pouring the material into a 100 ml. graduated cylinder. Tapped bulk density refers to the bulk density after the filled graduated cylinder is 100 times lifted 4 inches and dropped.

The dried granular product usually will have a loose bulk density below about 65 pounds per cubic foot, before being subjected to the final heating step. For barium carbonate this density usually will be in the range of about 55 to 65 pounds per cubic foot; and for strontium carbonate usually about 50 to 60 pounds per cubic foot.

As stated above, the dried granular product is then heated to a temperature in the range of about 600° to 700° C. This causes the granules to shrink, but without sintering. The heating normally is conducted in a separate vessel from the drier and is continued until the loose bulk density of the product increases by at least about 5 percent, preferably at least about 10 or 20 percent, as measured before and after heating. This usually will require at least about ten minutes, but normally not more than about 20 minutes. The carbonate should not be allowed to remain in the heating vessel long enough to cause it to sinter. The manner of heating is not known to be critical. It may be conducted, for example, in electrically heated furnaces or gas-fired rotary devices. Usually it will be preferred that the heating be conducted in an atmosphere that supports combustion, especially if an organic deflocculating agent is used.

After the heat-shrinking step the granules produced by the method of this invention preferably will have a particle size such that at least about 90 weight percent thereof will pass 14 mesh but not 150 mesh (Tyler). Their loose bulk density usually will be at least about 60 pounds per cubic foot. Barium carbonate so produced will preferably have a loose bulk density of at least about 75 pounds per cubic foot; strontium carbonate: preferably at least about 65 pounds per cubic foot.

As an optional step, once the suspended alkaline earth metal carbonate has been substantially completely deflocculated, a source of alkali metal cations may be added to the suspension to shorten the dissolution time in molten glass of the final granular product. This procedure is described in our patent application Ser. No. 946,069, filed Dec. 24, 1986. As there described, the addition of the alkali metal cation source prior to drying yields a final product that dissolves more quickly in the glass furnace melt. Upon addition of the alkali metal source, the mixture is preferably stirred or agitated to assure thorough blending of the ingredients. The mixing temperature is not critical, but preferably it is conducted at about 30° to 50° C.

As with the deflocculant, the alkali metal cation source should be water-soluble and glass-compatible. Sodium and potassium compounds are preferred, especially the sodium and potassium salts of inorganic anions. Suitable examples are sodium and potassium carbonates and silicates.

Although many suitable deflocculants are themselves sources of alkali metal cations, they usually are far more expensive than the carbonates and silicates. Also, the carbonate and silicate anions are highly compatible with glass, whereas some of the deflocculant anions may only be compatible in very low concentrations. Moreover, deflocculants, when added beyond the point of complete deflocculation, tend to cause the slurry viscosity to reascend rapidly. This can make it difficult to incorporate enough alkali metal into the suspension to provide a final product having the desired short melt time, before the suspension becomes non-fluid and, therefore, impractical to work with. For these reasons it is preferred that the alkali metal cation source not be a deflocculant. For the last mentioned reason it preferably is not a flocculant, such as sodium chloride, either.

Preferably, sufficient alkali metal cation source will be added to the suspension to provide at least about 0.01 gram atomic weight of alkali metal for each gram molecular weight of the alkaline earth metal carbonate. This refers to the total of all alkali metal in the suspension, including any provided by the deflocculant. Most preferably the ratio will be in the range of about 0.015:1 to 0.030:1.

The addition of the alkali metal cation source causes the low shear viscosity of the alkaline earth metal carbonate slurry to increase. While not wishing to be bound by theory, we believe this occurs because the cation source causes the deflocculated carbonate particles to aggregate. We think the ionic double layer surrounding each carbonate particle is partially collapsed, thus reducing the electrostatic repulsive forces necessary for dispersion, and allowing particle-to-particle attraction forces to become significant. The bulk density of the dried product does not seem to be appreciably altered by the viscosity increase, however. This is somewhat surprising, as the more common experience is that the more viscous the suspension, the lower the bulk density of the solids obtained upon spray drying it.

Generally, the preferred amount of alkali metal cation source added to the carbonate suspension will cause the low shear viscosity of the suspension to at least double, when measured in centipoises at 25° C. and a solids content of 39 volume percent. By a "solids content of 39 volume percent" is meant a suspension as described above, i.e., using 700 g. of the strontium carbonate per 300 ml. of water, or 740 g. of the barium carbonate per 260 ml. of water. As discussed in application Ser. No. 946,069, it appears that the more alkali metal cation source that is added, the better is the solubility of the final carbonate product in molten glass. If too much cation source is added, however, the suspension becomes so viscous it no longer flows, which makes it difficult, if not impossible, to dry it to a granular product.

The invention is further illustrated by the following examples:

EXAMPLE I (Preparation of Granular Strontium Carbonate)

Freshly precipitated strontium carbonate crystals are dewatered in a continuous pressure filter to yield a 67% by weight strontium carbonate filter cake having the consistency of a crumbly, semi-hard clay. (If this flocculated filter cake is dried at 110° C. and pulverized, the loose bulk density of the dry strontium carbonate will be 37 lb./ft.$^3$, the tapped bulk density about 65 lb/ft.$^3$, and the packed powder will not flow). The wet filter cake is continuously introduced into a 10 HP, 4½ gallon capacity Kneadermaster mixer, manufactured by Patterson Corp., Toccoa, Georgia, at the rate of 80 pounds of filter cake per minute. Colloid 211 sodium polyacrylate dispersant, manufactured by North Chemical Company, is simultaneously added to the mixer at the rate of 140 ml. per minute. A substantially completely deflocculated fluid suspension flows continuously out of the mixer into an open-throated Moyno pump. The suspension is pumped into a stirred 20,000 gallon tank. Some of the suspension is recycled to the mixer to aid the deflocculation. None of the ingredients or equipment is heated or cooled; the mixing is conducted at room temperature.

The suspension in the stirred tank has a low shear viscosity at 25° C. of approximately 100 centipoises. It is pumped into a spray drier by a Manton-Gaulin pump and atomized by a Spraying Systems T2 nozzle. The inlet temperature of the spray drier is held at approximately 600° C. and the spraying pressure used is approximately 900 pounds per square inch gauge (psig). A substantially dry, bead-like product is obtained leaving the spray dryer at a temperature of about 90° C. and having the following properties: loose bulk density of 62 lb./ft.$^3$; 20 wt. % passing 10 mesh and held on a 14 mesh screen, and 99 wt.% held on a 150 mesh screen.

The spray-dried strontium carbonate granules (sometimes referred to as "pellicles") are continuously conveyed via a belt conveyor to a gas-fired rotary kiln. The kiln temperature is maintained at 650° C. The rate of feed is approximately 1½ tons per hour. The residence time while the beads are tumbled in the kiln in approximately 40 minutes. The heat treatment substantially shrinks the strontium carbonate beads without sintering them, leaving them with a loose bulk density of 80 lb./ft.$^3$ and a particle size such that about 95 wt. % passes 14 mesh and is held on 150 mesh.

EXAMPLE II (Preparation of Sodium-Enriched Strontium Carbonate)

The process of Example I is repeated, except that a source of sodium cations is added to the deflocculated strontium carbonate slurry before it is spray dried. Chem-Silate ®41A, a commercially available aqueous solution of 3.2 ratio sodium silicate (i.e., $Na_2O$ 3.2 $SiO_2$) having a concentration of 37 weight percent, is added batchwise to the stirred 20,000 gallon tank at the rate of 4.3 gallons for each 185 gallons of slurry in the tank. This amounts to 2.5% of sodium silicate solution, based on the dry weight of the strontium carbonate. The resultant slurry has a low shear viscosity at 25° C. of approximately 400 centipoises. It is pumped into the spray drier at a nozzle pressure of about 900 psig.

After spray drying, the strontium carbonate beads have a loose bulk density of about 62 lb./ft.$^3$ and a particle size distribution such that about 20 wt. % thereof pass 10 mesh but are held on 14 mesh, and about 99 wt. % are held on 150 mesh.

But whereas the beads in Example I contain only about 0.0034 gram atom of sodium per each mole of $SrCO_3$, the beads of this example contain about 0.014 gram atom of Na per mole of $SrCo_3$.

After heating in the rotary dryer, the beads exhibit a loose bulk density of about 70 lb./ft.$^3$ and a particle size distribution such that about 95 wt. % passes 14 mesh and is held on 150 mesh.

EXAMPLE III (Preparation of Granular Barium Carbonate)

Freshly precipitated barium carbonate crystals are dewatered in a continuous pressure filter to yield a 75% by weight barium carbonate filter cake having the consistency of a crumbly, semi-hard clay. (If this flocculated filter cake is dried at 110° C. and pulverized, the loose bulk density of the dry barium carbonate will be 44 lb./ft.$^3$, the tapped bulk density about 75 lb./ft.$^3$., and the packed powder will not flow.) The wet filter cake is continuously introduced into a 10 HP, 4½ gallon capacity Kneadermaster mixer at the rate of 80 pounds of filter cake per minute. Colloid 211 polyacrylate dispersant solution is simultaneously added to the mixer at the rate of 65 ml. per minute. A substantially completely deflocculated fluid suspension, having a low shear viscosity at 25° C. of approximately 80 centipoises, flows continuously out of the mixer into an open-throated Moyno pump. The suspension is pumped into a stirred 20,000 gallon tank. Some of the dispersed slurry is recycled to the mixer to aid defloccuation.

The suspension in the stirred 20,000 gallon tank has a low shear viscosity at 25° C. of approximately 80 centipoises. It is pumped into the spray dryer by a Manton-Gaulin pump and atomized through a Spraying Systems T2 nozzle at a pressure of approximately 1000 psig. The inlet temperature of the spray dryer is held at approximately 600° C. A bead-like product is obtained leaving the spray dryer at a temperature of about 90° C. and having the following properties: loose bulk density of 70 lb./ft.$^3$; 15 wt. % passing 10 mesh and held on 14 mesh, and 99 wt. % held on 150 mesh.

The spray-dried barium carbonate granules are continuously fed to a rotary dryer as described in Example I. The dryer temperature is maintained at 650° C. The rate of feed is about 1½ tons per hour. The residence time is approximately 40 minutes. The heat treatment substantially shrinks the barium carbonate beads without sintering them, leaving them with a loose bulk density of 80 lb./ft.$^3$ and a particle size such that 95 wt. % passes 14 mesh and is held on 150 mesh.

EXAMPLE IV (Preparation of Sodium-Enriched Barium Carbonate)

The process of Example III is repeated, except that a source of sodium cations is added to the deflocculated strontium carbonate slurry before it is spray dried. Chem-Silate 41A is added batchwise to the stirred 20,000 gallon tank at the rate of 5.2 gallons for each 135 gallons of slurry in the tank. This amounts to 3.0% of sodium silicate, based on the dry weight of the barium carbonate. The resultant slurry has a low shear viscosity at 25° C. of approximately 3800 centipoises. It is pumped into the spray dryer at a nozzle pressure of about 1000 psig.

After spray drying, the barium carbonate beads have a loose bulk density of about 70 lb./ft.$^3$ and a particle size distribution such that about 15 wt. % thereof pass 10 mesh but are held on 14 mesh, and about 99 wt. % are held on 150 mesh.

Whereas the beads in Example III contain only about 0.0002 gram atom of Na per each mole of $BaCO_3$, the beads of this example contain about 0.020 gram atom per mole.

After heating in the rotary dryer, the beads exhibit a loose bulk density of about 75 lb./ft.$^3$ and a particle size distribution such that about 95 wt. % passes 14 mesh and is held on 150 mesh.

EXAMPLE V (Comparison with Prior Art Bulk Densities)

To illustrate the unique shrinkage that occurs when the alkaline earth metal carbonate granules are prepared by the process of the present invention, the bulk densities of the same strontium carbonate, when dried in different ways, were measured and compared. As reported in the following table, the freshly precipitated filter cake was divided into three portions. One was dried at 110° C. in a laboratory oven and then pulverized using a mortar and pestle. The second portion was deflocculated with sodium polyacrylate, dried at 110° C., and then pulverized. The third portion was deflocculated and then spray dried to form minus 10 mesh, plus 150 mesh beads. All three portions were then heated for approximately 10 minutes at 650° C. The bulk densities of the powdered materials (minus 150 mesh particle size) were measured after tapping. The density of the granular material was measured loose. In our experience with these materials, tapping generally adds about 10 lb./ft.$^3$ to the bulk density.

As reported in the table, the deflocculated granular product is the one that exhibited the greatest shrinkage when subjected to the final heat treatment. It experienced approximately a 43% increase in bulk density. This material's final loose bulk density of 80 lb./ft.$^3$ is much closer to that of sintered strontium carbonate than either of the other two portions is. Sintered strontium carbonate, after grinding and screening to approximately the same particle size, normally has a loose bulk density of about 105 lb./ft.$^3$.

TABLE I

| Alkaline Earth Metal Carbonate | Physical Form | Bulk Density, lb./ft.$^3$ | |
|---|---|---|---|
| | | Before Heating | After 10 Min. at 650° C. |
| SrCO$_3$ | Dried filter cake, no deflocculant, minus 150 mesh (Tyler) | 37 | 39 |
| SrCO$_3$ | Dried filter cake, deflocculated with Colloid 211$^{(1)}$, minus 150 mesh (Tyler) | 57 | 64 |
| SrCO$_3$ | Spray dried slurry, deflocculated with Alcosperse 149$^{(2)}$, minus 10 mesh, plus 150 mesh | 56 | 80 |

$^{(1)}$Commercially available 43 wt. % solution of sodium polyacrylate in water. The poly(acrylic acid) has a number average molecular weight of approximately 1800 and substantially all its carboxyl groups are neutralized with the sodium.
$^{(2)}$Commercially available 43 wt. % solution of sodium polyacrylate in water, the poly(acrylic acid) has a number average molecular weight of approximately 1800 and substantially all of its carboxyl groups are neutralized with sodium.

EXAMPLE VI (Comparison of Different Deflocculants and Sodium Sources)

To illustrate the effect of different deflocculants and sodium cation sources on the final bulk density of granular alkaline earth metal carbonates prepared by the process of the present invention, freshly precipitated strontium carbonate filter cake was divided into five portions and treated as follows. Two portions were deflocculated with sodium polyacrylate and three were deflocculated with sodium hexametaphosphate. Four-tenths (0.4) weight percent sodium carbonate was added to two of the portions, and 0.6% sodium carbamate was added to another portion. All five slurries were spray-dried using an inlet temperature of 600° C. to a minus 10 mesh, plus 140 mesh particle size. Then each sample was heated for about 10 minutes at 650° C. The resultant loose bulk densities are shown in the following table. As seen from the data there, the incorporation of the added alkali metal cation did not appreciably change the bulk density of any of the products.

TABLE II

| Alkaline Earth Metal Carbonate | Deflocculant | Additional Cation Source | Loose Bulk Density, lb./ft. | |
|---|---|---|---|---|
| | | | Before Heating | After Heating |
| SrCO$_3$ | Alcosperse 149 | — | 56 | 80 |
| SrCO$_3$ | Alcosperse 149 | 0.4% Na$_2$CO$_3$ | 56 | 80 |
| SrCO$_3$ | Na Hexametaphosphate | — | 57 | 68 |
| SrCO$_3$ | Na Hexametaphosphate | 0.4% Na$_2$CO$_3$ | 56 | 67 |
| SrCO$_3$ | Na Hexametaphosphate | 0.6% Na$_2$CO$_3$ | 56 | 68 |

EXAMPLE VII (Manufacture of Glass Face Plates for Color TV Sets)

The following ingredients are intimately blended in the stated amounts to form a batch of glass furnace feed:

| Ingredient | Weight (kg) |
|---|---|
| Sand | 295 |
| Dolomitic limestone | 15.4 |
| Feldspar | 47 |
| Soda ash | 54 |
| Potassium carbonate | 61 |
| Strontium carbonate | 74 |
| Barium carbonate | 12 |
| Litharge | 9 |
| Ceric hydroxide | 0.8 |
| Aqueous arsenic acid solution (15 wt. % concentration) | 6 |
| Antimony oxide | 1.1 |
| Titanium dioxide | 0.7 |
| Cullet (crushed glass) | 430 |

The blended batch of glass furnace feed is continuously introduced into the glass furnace at the controlled rate of 1/22 of the furnace's glass-holding capacity per hour. The melting zone of the furnace is held at 1350° C., the fining zone at 1450° C., and the conditioning zone at 1200° C. The molten glass flows out of the furnace and is formed into the shape of television face plates in stainless steel molds at about 1000° C.

The face plates are inspected for defects. Tiny "cold glass" defects, which show up as bright spots in the glass when the glass is illuminated, cause a face plate to be rejected and crushed up to be reintroduced to the glass furnace as cullet. When the strontium carbonate ingredient is a sintered product such as Strontium Carbonate, Type C, manufactured by Chemical Products Corporation, and the barium carbonate is a sintered product such as Barium Carbonate, Type CFF, also manufactured by Chemical Products Corporation, the 25-inch color TV face plates rejected because of "stones" and "cold glass defects" are approximately 10% of all these face plates molded. But when the strontium carbonate and barium carbonate ingredients are the unsintered products of Examples I and III herein, the face plates rejected are only about 8% of all those molded. When the sodium-enriched strontium and barium carbonates of Examples II and IV are used, the number of rejected face plates drops even further, to about 7 percent.

EXAMPLE VIII (Manufacture of Glass Face Plates for Black-And-White TV Sets)

The following ingredients are intimately blended in the stated amounts to form a batch of glass furnace feed:

| Ingredient | Weight (kg) |
|---|---|
| Sand | 280 |
| Feldspar | 94 |
| Lithium carbonate | 6 |
| Soda ash | 61 |
| Potassium carbonate | 59 |
| Lead carbonate | 12 |
| Barium carbonate | 81 |
| Antimony oxide | 1.1 |
| Aqueous arsenic acid | 6 |

| Ingredient | Weight (kg) |
| --- | --- |
| solution (15 wt. % concentration) | |
| Cobalt oxide | 0.4 |
| Nickel oxide | 0.5 |
| Cullet | 415 |

The blended batch of glass furnace feed is continuously introduced into the glass furnace at the controlled rate of 1/25 of the furnace's glass-holding capacity per hour. The melting zone of the furnace is held at 1300° C., the fining zone at 1400° C., and the conditioning zone at 1200° C. The molten glass flows out of the furnace and is formed into the shape of television face plates in stainless steel molds at about 1000° C.

The face plates are inspected for defects. When the barium carbonate ingredient is a sintered product such as Barium Carbonate, Type CFF, the 19-inch black-and-white television face plates rejected because of "stones" and "cold glass defects" are approximately 12% of all these face plates molded. When the barium carbonate ingredient is the product of Example III herein, only about 10% of the face plates have to be rejected, and when it is the sodium-enriched product of Example IV herein, the number of rejects drops to about 9%.

We claim:

1. A method of converting precipitated alkaline earth metal carbonate selected from the group consisting of strontium carbonate and barium carbonate into a granular form suitable for use in a feedstock to a glass furnace, comprising the steps of
    (a) forming a suspension of the precipitated carbonate in water containing a water-soluble deflocculating agent that dissolves in molten glass without causing defects in the glass, said suspension containing at least about 35 volume percent of the carbonate and sufficient deflocculating agent to substantially completely deflocculate the carbonate;
    (b) drying the resultant suspension at an elevated temperature so as to produce a substantially dry, granular product, at least about 80 weight percent of which has a particle size passing 10 mesh but not 150 mesh (Tyler), said drying being conducted without allowing the product to reach 400° C.; and
    (c) heating the resultant granular product in a zone maintained at a temperature in the range of about 600° to 700° C. for a time long enough to increase the loose bulk density of the granular product by at least about 5 percent, but not for so long a time as to cause the product to sinter.

2. The method of claim 1 wherein the deflocculating agent is selected from the group consisting of inorganic condensed phosphates and salts containing n organic, polymeric, macromolecular anion having a number average molecular weight in the range of about 500 to 5,000, said salts being selected from the group consisting of alkali metal and ammonium salts of polymers of ethylenically-unsaturated carboxylic acids, sulfonated condensation products of naphthalene and formaldehyde, and lignosulfonic acid.

3. The method of claim 2 wherein, in step (b), the suspension is spray dried using a spray drier operating at an inlet temperature in the range of about 400° to 600° C., to produce a granular product having a loose bulk density below about 65 pounds per cubic foot, the residence time of the suspended solids in the spray drier being short enough that they do not reach a temperature in excess of about 200° C. before leaving the drier.

4. The method of claim 3 wherein the ethylenically-unsaturated carboxylic acid is selected from the group consisting of acrylic acid and methacrylic acid.

5. The method of claim 3 wherein the water-soluble condensed phosphate is an alkali metal salt of a condensed phosphate selected from the group consisting of pyrophosphates, hexametaphosphates, tripolyphosphates, and tetraphosphates.

6. The method of claim 4 wherein the water-soluble condensed phosphate is an alkali metal salt of a condensed phosphate selected from the group consisting of pyrophosphates, hexametaphosphates, tripolyphosphates, and tetraphosphates and, in step (c), the heating is conducted while tumbling the spray dried product.

7. The method of claim 3 wherein, in step (a), the alkaline earth metal carbonate is barium carbonate having a particle size primarily in the range of about 0.7 to 1.1 microns, the granular product of step (b) has a loose bulk density in the range of about 55 to 65 pounds per cubic foot, and the product of step (c) has a loose bulk density of at least about 85 pounds per cubic foot.

8. The method of claim 7 wherein, in step (c), the heating is conducted for about 10 to 20 minutes and wherein at least about 90 weight percent of the product of step (c) has a particle size passing 14 mesh but not 150 mesh (Tyler).

9. The method of claim 8 wherein, between steps (a) and (b), a water-soluble source of alkali metal cations that dissolves in molten glass without causing defects in the glass is added to the suspension in an amount sufficient to shorten the dissolution time in molten glass of the granular barium carbonate product produced in step (c).

10. The method of claim 9 wherein the source of alkali metal cations is selected from the group consisting of sodium and potassium salts of inorganic anions.

11. The method of claim 10 wherein the inorganic anions are selected from the group consisting of carbonate and silicate anions.

12. The method of claim 11 wherein the amount of the source of alkali metal cations used is sufficient to provide at least about 0.01 gram atomic weight of alkali metal per each gram molecular weight of alkaline earth metal carbonate in the suspension.

13. The method of claim 11 wherein the amount of the source of alkali metal cations used is sufficient to provide about 0.015 to 0.03 gram atomic weight of alkali metal per each gram molecular weight of alkaline earth metal carbonate in the suspension.

14. The method of claim 3 wherein, in step (a), the alkaline earth metal carbonate is strontium carbonate having a particle size primarily in the range of about 0.6 to 1.0 micron, the granular product of step (b) has a loose bulk density in the range of about 50 to 60 pounds per cubic foot, and the product of step (c) has a loose bulk density of at least about 75 pounds per cubic foot.

15. The method of claim 14 wherein at least about 90 weight percent of the product of step (c) has a particle size passing 14 mesh but not 150 mesh (Tyler).

16. The method of claim 15 wherein, between steps (a) and (b), a water-soluble source of alkali metal cations that will dissolve in molten glass without causing defects in the glass is added to the suspension in an amount sufficient to shorten the dissolution time in molten glass of the granular strontium carbonate product produced in step (c).

17. The method of claim 16 wherein the source of alkali metal cations is selected from the group consisting of sodium and potassium salts of inorganic anions.

18. The method of claim 17 wherein the inorganic anions are selected from the group consisting of carbonate and silicate anions.

19. The method of claim 18 wherein the amount of the source of alkali metal cations used is sufficient to provide at least about 0.01 gram atomic weight of alkali metal per each gram molecular weight of alkaline earth metal carbonate in the suspension.

20. The method of claim 18 wherein the amount of the source of alkali metal cations used is sufficient to provide about 0.015 to 0.03 gram atomic weight of alkali metal per each gram molecular weight of alkaline earth metal carbonate in the suspension.

21. The method of claim 3 wherein the deflocculating agent is selected from the group consisting of sodium and potassium salts of polymers of acrylic and methacrylic acids having number average molecular weights in the range of about 500 to 5000 and, in step (c), the heating is conducted in an atmosphere that supports combustion.

22. The method of claim 3 wherein the deflocculating agent is sodium polyacrylate, the polyacrylate anion of which has a number average molecular weight of about 1,000 to 3,000 and, in step (c), the heating is conducted while tumbling the spray-dried product in a gas-fired rotary kiln for a time long enough to increase the loose bulk density of the granular product by at least about 10 percent.

23. A method of converting precipitated barium carbonate into granular form for use in a feedstock to a glass furnace, comprising the steps of
(a) forming a suspension of the carbonate in water containing a deflocculating agent selected from the group consisting of sodium polyacrylate, potassium polyacrylate, sodium hexametaphosphate, and tetrasodium pyrophosphate, said suspension containing at least about 71 percent of the barium carbonate, based upon the weight of the suspension, and sufficient deflocculating agent to substantially completely defloccuate the barium carbonate;
(b) adding sufficient salt selected from the group consisting of sodium and potassium carbonates and silicates to the suspension to increase the low shear viscosity of the suspension (measured in centipoises at 25° C. and 39 volume percent solids) by at least about 100 percent, but not so much that the suspension no longer flows;
(c) spray drying the resultant suspension using a spray drier operating at an inlet temperature of about 400° to 600° C. so as to produce a substantially dry, granular product having a loose bulk density in the range of about 55 to 65 pounds per cubic foot, at least about 80 weight percent of which has a particle size passing 10 mesh but not 150 mesh (Tyler), said drying being conducted without allowing the product to reach 400° C.; and
(d) heating the resultant granular product in an atmosphere that supports combustion in a zone maintained at a temperature in the range of about 600° to 700° C. for a time long enough to increase the loose bulk density of the product by at least about 10 percent, but not for so long a time as to cause the product to sinter.

24. A method of converting precipitated strontium carbonate into a granular form for use in a feedstock to a glass furnace, comprising the steps of
(a) forming a suspension of the carbonate in water containing a deflocculating agent selected from the group consisting of sodium polyacrylate, potassium polyacrylate, sodium hexametaphosphate, and tetrasodium pyrophosphate, said suspension containing at least about 67 percent of the strontium carbonate, based upon the weight of the suspension, and sufficient deflocculating agent to substantially completely defloccuate the strontium carbonate;
(b) adding sufficient salt selected from the group consisting of sodium and potassium carbonates and silicates to the suspension to increase the low shear viscosity of the suspension (measured in centipoises at 25° C. and 39 volume percent solids) by at least about 100 percent, but not so much that the suspension no longer flows.
(c) spray drying the resultant suspension using a spray drier operating at an inlet temperature of about 400° to 600° C. so as to produce a substantially dry, granular product having a loose bulk density in the range of about 50 to 60 pounds per cubic foot, at least about 80 weight percent of which has a particle size passing 10 mesh but not 150 mesh (Tyler), said drying being conducted without allowing the product to reach, 400° C.; and
(d) heating the resultant granular product in an atmosphere that supports combustion in a zone maintained at a temperature in the range of about 600° to 700° C. for a time long enough to increase the tapped bulk density of the product by at least about 20 percent, but not for so long a time as to cause the product to sinter.

25. The method of claim 23 wherein, in step (c), the barium carbonate leaves the spray drier at a temperature of about 70° to 200° C.

26. The method of claim 24 wherein, in step (c), the strontium carbonate leaves the spray drier at a temperature of about 70° to 200° C.

* * * * *